May 7, 1929.  J. H. SPARSHATT  1,712,363
COVER OR TILT FOR ROAD TRANSPORT VEHICLES
Filed Feb. 2, 1927  2 Sheets-Sheet 1

INVENTOR:
John Herbert Sparshatt.
PER
ATTORNEY.

May 7, 1929. J. H. SPARSHATT 1,712,363
COVER OR TILT FOR ROAD TRANSPORT VEHICLES
Filed Feb. 2, 1927 2 Sheets-Sheet 2

INVENTOR:
JOHN HERBERT SPARSHATT.
per HCNride
ATTORNEY.

Patented May 7, 1929.

1,712,363

UNITED STATES PATENT OFFICE.

JOHN HERBERT SPARSHATT, OF PORTSMOUTH, ENGLAND.

COVER OR TILT FOR ROAD TRANSPORT VEHICLES.

Application filed February 2, 1927, Serial No. 165,402, and in Great Britain April 1, 1926.

The invention relates to road vehicles, and consists of improvements in or modifications of the subject of my previous application Serial No. 50,672 filed August 17th, 1925 for covers or tilts for road transport vehicles.

According to one part of the present invention the driver's seat-box or cab and a fixed forward part of the hood, or a fixed forward part of the hood only, or forward supports not being a driver's cab or seat-box, serve to carry the hood during and after the displacement.

According to another part of the present invention a self-jointing system is provided to prevent rain, dust, etc., from driving into the vehicle through a gap between the relative moving parts.

The present invention is illustrated by way of example in the accompanying drawings.

Fig. 9 is a detail view of a locking arrangement hereinafter referred to.

Figure 1:
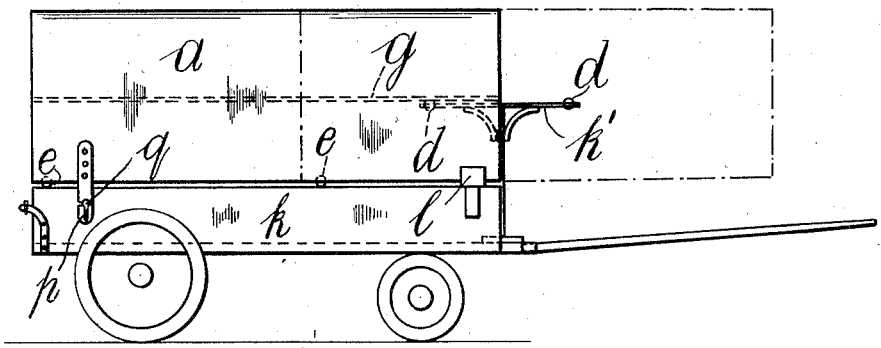
Fig. 1 is a side view of a horse drawn vehicle without a driver's seat-box.

In Fig. 1 *a* is a hood of a horse vehicle displaceable over the driver's seat by being slidingly mounted on supports (sides *k*) upstanding from the vehicle floor, and forward supports *k'* arranged on each side of the driver's seat. *d* and *e* are rollers and *g* are tracks one on each side of the tilt. *p, q* is a screw-nutted hook and bolt fastening for securing the hood in the closed position. Slide guides *l, l'* hold the hood from displacement sidewise as well as vertically.

Figure 2:
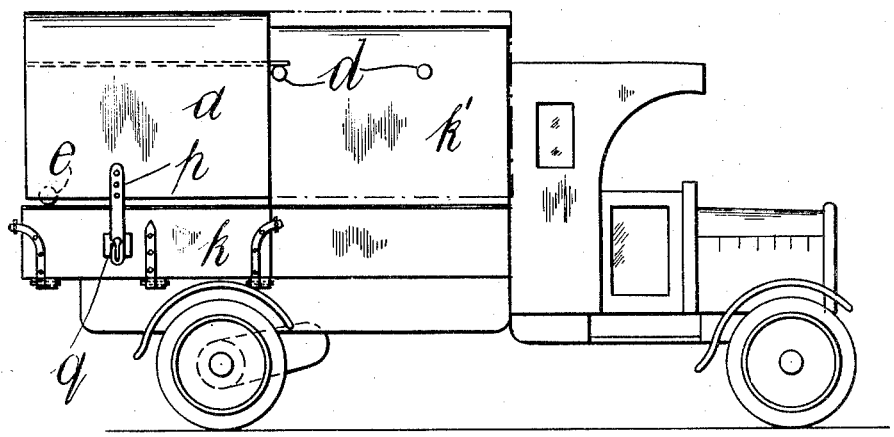
Fig. 2 is a side view of a vehicle having a part fixed and part displaceable hood.

Fig. 2 shows how the hood may comprise a forward fixed part *k'*, and a rear displaceable part *a* and the latter carried by the forward fixed part during and after the displacement.

Figure 3:
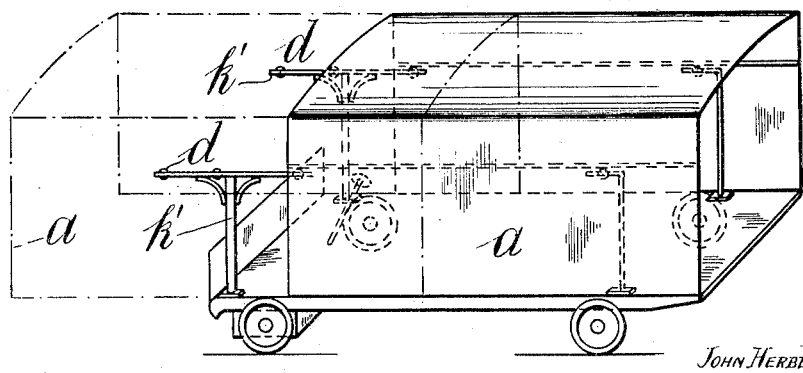
Fig. 3 is a side view of a so-called dock trolley.

Fig. 3 shows a hood applied to a dock trolley or the like.

Figure 4:
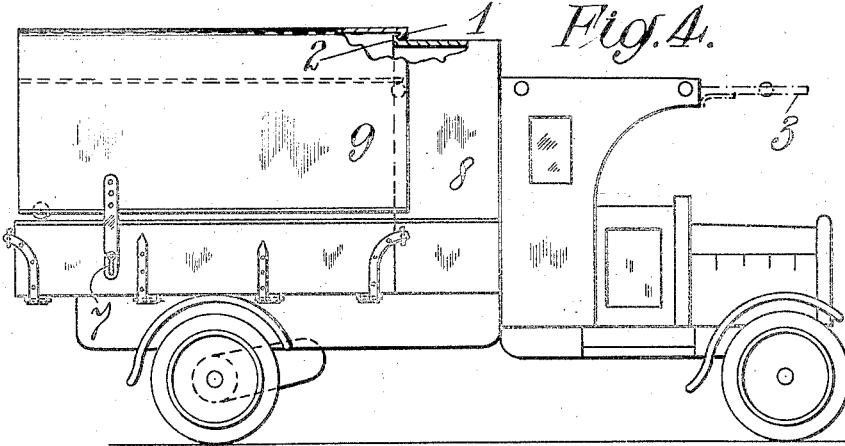
Fig. 4 is a side view of a vehicle having a part fixed and part displaceable hood with jointing provision to seal gaps, Figs. 5 and 6 being detail views thereof.
Figure 5:
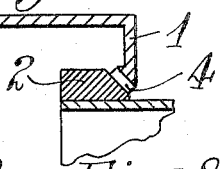
Figure 6:
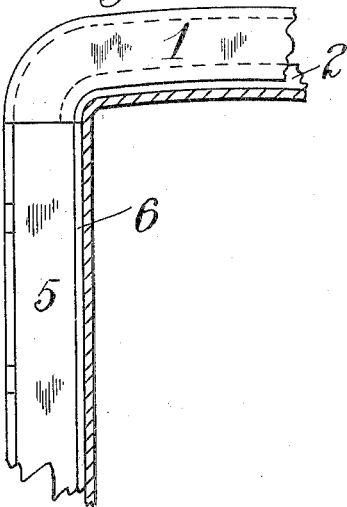

Figs. 4, 5 and 6 show by way of example a form of jointing system with the object of excluding rain, dust, etc., from entering into the vehicle. The opening at the top between the front of the sliding tilt and the fixed forward support may be effectively closed by a headboard 1 across the front open end of the tilt contacting with a rib or like 2 arranged on the rear end of the fixed forward support. A strip 4 of rubber or similar yielding material may be secured to the contacting face of the headboard 1 and/or the rib 2.

The clearance at the sides between the fixed and moving parts may be closed by flaps 5 hinged to the front edges of the sides of the tilt and provided with rubber or like strips 6 on their free edges which make contact when the flaps are closed with the sides of the fixed forward support.

The lever nuts 7 which lock the tilt in normal position also serve to give the necessary contacting pressure to the flaps, and upon unscrewing the nuts 7, the sides of the tilt tend to spread slightly thus freeing the flaps for easy opening.

Fig. 4 shows a fixed portion 8 of the tilt as the forward support for the sliding portion 9 of the tilt in which case the jointing is facilitated, as a relatively narrow headboard is sufficient to bridge the gap between the fixed and moving parts. This portion 8 may have an extended runway 3.

The sides of the vehicle instead of being drop sides may be removable sides.

Figures 7, 8:
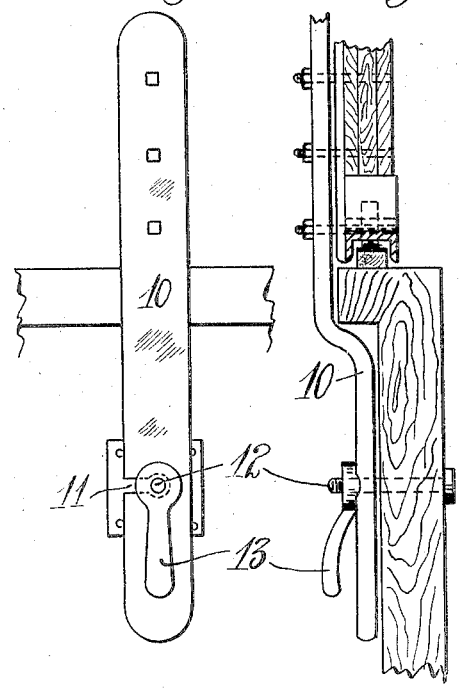
Fig. 7 is a side view and Fig. 8 an end view of an arrangement for locking the tilt in its normal position.

In Figs. 7 and 8 there is shown a modified device for locking the tilt in its closed position. A plate or bar 10 bolted to the side of the tilt is slotted at 11 to engage a screw bolt 12 on the side of the vehicle, a fly or lever nut 13 working on the bolt serving to retain the tilt in position. This arrangement has the advantage of being within comfortable reach of the operator, which is not always the case where the locking bolt is on the tilt itself.

Figure 9:
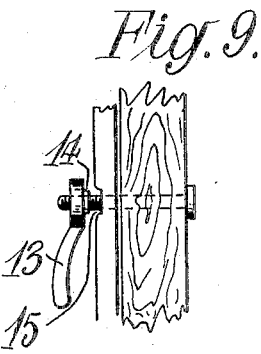

In Fig. 9, the locking nut 13 is provided with an upstanding boss 14 fitting into a recess 15 in the bar or plate 10, so as to increase the surface grip, so that the risk of accidental or unauthorized unlocking is minimized.

What I claim is:—

1. In combination, a vehicle body having a load platform, a sliding cover for said platform, a run-way forward of said platform, said cover sliding bodily into supporting relationship with said run-way, and flaps interposed between the sides of said sliding cover and the fixed part forming the sides of the run-way.

2. A transport vehicle as claimed in claim 1, in which the flaps are hinged to the side of the cover.

In testimony whereof, I affix my signature.

JOHN HERBERT SPARSHATT.